US012739094B2

(12) United States Patent
Shoor et al.

(10) Patent No.: US 12,739,094 B2
(45) Date of Patent: Sep. 15, 2026

(54) DYNAMIC SPREAD-SPECTRUM-CLOCKING CONTROL

(71) Applicant: Intel Corporation, Santa Clara, CA (US)

(72) Inventors: Ehud Shoor, Haifa (IL); Tsion Vidal, Jerusalem (IL); Vladislav Kopzon, Haifa (IL); Uri Hermoni, Nordia (IL); Golan Cohen, Even-Yehuda (IL); Efraim Kugman, Givat Zeev (IL); Ziv Kabiry, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/858,692

(22) Filed: Jul. 6, 2022

(65) Prior Publication Data

US 2022/0345289 A1 Oct. 27, 2022

(51) Int. Cl.
*H04L 7/033* (2006.01)

(52) U.S. Cl.
CPC .................................... *H04L 7/033* (2013.01)

(58) Field of Classification Search
CPC ... H04L 7/00; H04L 7/033; G06F 1/08; G06F 1/32; G06F 9/44; G06F 13/20; G06F 13/28

(Continued)

(56) References Cited

U.S. PATENT DOCUMENTS

2009/0125735 A1* 5/2009 Zimmerman ........... G06F 1/325 370/503

2010/0127739 A1* 5/2010 Ebuchi .................... H03L 7/197 327/148

(Continued)

FOREIGN PATENT DOCUMENTS

CN 1561023 1/2005
CN 104951413 5/2020

(Continued)

OTHER PUBLICATIONS

"International Application Serial No. PCT US2023 019960, International Search Report mailed Aug. 4, 2023", 4 pgs.

(Continued)

*Primary Examiner* — Young T. Tse
(74) *Attorney, Agent, or Firm* — Schwegman Lundberg & Woessner, P.A.

(57) ABSTRACT

The circuits and methods described herein provide technical solutions for technical problems facing USB links. To reduce or eliminate effects associated with a USB link entering a low-power mode, initial link acquisition may be performed while the spread-spectrum-clocking (SSC) modulation is disabled. Following the initial link acquisition, the SSC modulation may be enabled dynamically in a later stage. This delayed enablement of the re-timers provides improved performance over solutions in which the SSC modulation is constantly enabled, including reducing the complexity of the timing training process and enabling a faster USB link re-establishment. This reduced link acquisition period may enable the system to enter power saving modes more frequently, and may reduce latency involved in exiting power saving modes. This may maintain or improve total USB transmission speeds and may reduce USB-related power consumption for USB connected devices.

21 Claims, 4 Drawing Sheets

(58) Field of Classification Search
USPC ........ 375/257, 259, 260, 312, 376; 710/104, 710/106, 118, 125
See application file for complete search history.

(56) References Cited

U.S. PATENT DOCUMENTS

| | | | | |
|---|---|---|---|---|
| 2011/0103427 | A1 | 5/2011 | Bafra et al. | |
| 2015/0312019 | A1 | 10/2015 | Lee et al. | |
| 2016/0170472 | A1 | 6/2016 | Cosaro | |
| 2017/0005780 | A1 | 1/2017 | Nandy et al. | |
| 2017/0017604 | A1* | 1/2017 | Chen | G06F 11/3027 |
| 2017/0366468 | A1* | 12/2017 | Shoor | H04L 1/0018 |
| 2019/0363869 | A1* | 11/2019 | Li | H04L 7/0058 |
| 2021/0313993 | A1* | 10/2021 | Bai | H04L 7/005 |

FOREIGN PATENT DOCUMENTS

| | | | |
|---|---|---|---|
| CN | 119325695 | A | 1/2025 |
| WO | WO-2024010630 | A1 | 1/2024 |

OTHER PUBLICATIONS

"International Application Serial No. PCT US2023 019960, Written Opinion mailed Aug. 4, 2023", 4 pgs.
"International Application Serial No. PCT/US2023/019960, International Preliminary Report on Patentability mailed Jan. 16, 2025", 6 pgs
"European Application Serial No. 23835961.6, Extended European Search Report mailed Apr. 30, 2026", 9 pgs.

* cited by examiner

DYNAMIC SPREAD-SPECTRUM-CLOCKING CONTROL

TECHNICAL FIELD

Embodiments described herein generally relate to universal serial bus (USB) devices.

BACKGROUND

USB cables may be used to connect electronic devices via a USB link. Each USB link may include two end-point transceivers and up to 6 bit-level re-timers in between the two end-point transceivers. When sending data over a USB link, the data is sent from the end-point transmitters using spread-spectrum-clocking (SSC) and re-transmitted in each of the re-timers using the recovered clock extracted from the signal.

USB links may include an SSC modulated clock, which may be required to comply with client connectivity standards such as reduced electromagnetic interference (EMI) requirements. This SSC modulated clock may also be used to comply with EMI requirements for other communication systems, such as Display-Port, Peripheral Component Interconnect Express (PCI-E), and other communication systems. While the use of an SSC modulated clock may provide improved EMI performance, the SSC modulated clock creates timing challenges and other technical challenges.

When a USB link enters power-saving mode, the USB link goes down until one of the endpoints initiates link re-establishment. However, reestablishing the USB link across re-timers requires additional time for each of the re-timers, which increases the latency associated with a given USB link. To enter low-power mode, an additional delay of 60 μs or more may be added to allow a USB link to switch to an incoming clock that contains SSC modulation.

The total time required to reestablish a USB link may exceed the requirements for that USB link, and often causes the exit latency to be higher than the time required for reestablishing the link without corrupting the USB data. This additional delay may result in the USB link being prevented from entering a low-power mode, especially for higher-bandwidth USB links. What is needed is an improved USB link low-power mode.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
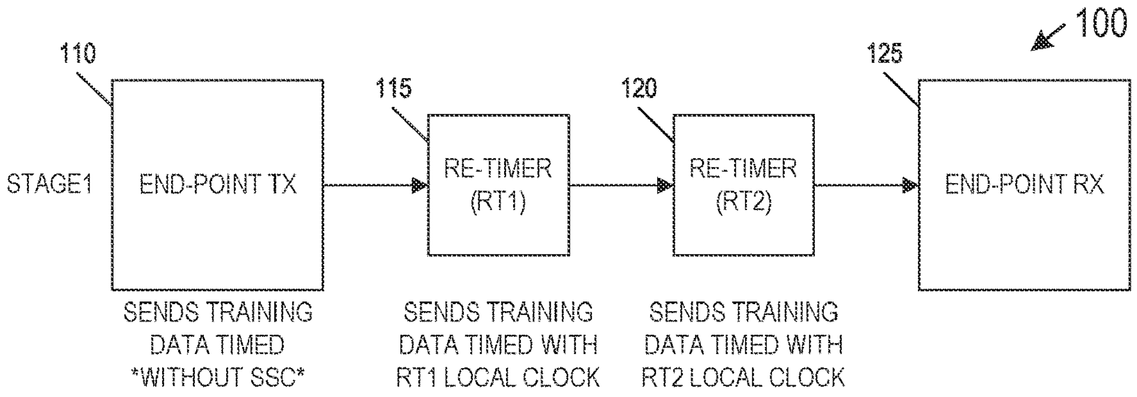
FIGS. 1A-ID are block diagrams illustrating a communication link reestablishment, according to an embodiment.

The circuits and methods described herein provide technical solutions for technical problems facing USB links. To reduce or eliminate effects associated with a USB link entering a low-power mode, initial link acquisition may be performed while the spread-spectrum-clocking (SSC) modulation is disabled, which will provide for a more relaxed initial condition and will enable faster and more robust link establishment. Following the initial link acquisition, the SSC modulation may be enabled dynamically in a later stage, such as to maintain compliance with electromagnetic interference (EMI) requirements. When the USB links includes re-timers, the SSC modulation may be disabled during the initial USB link training, and activation of the re-timers may be delayed until after the clock switching process within each re-timer is completed. To enable this dynamically delayed enablement of the clock switching process, the training protocol that is managing the clock switching process may provide an indication to an end-point transmitter as soon as all of the re-timers have switched to forward the incoming data with the associated receiver clock. In response to receiving this indication from the re-timers, the end-point transmitter may enable SSC modulation.

This delayed enablement of the re-timers provides improved performance over solutions in which the SSC modulation is constantly enabled, including reducing the complexity of the timing training process and enabling a faster USB link re-establishment. This reduced link acquisition period may enable the system to enter power saving modes more frequently, and may reduce latency involved in exiting power saving modes (e.g., faster system wakeup). This may maintain or improve total USB transmission speeds and may reduce USB-related power consumption for USB connected devices.

In the following description, for purposes of explanation, numerous specific details are set forth to provide a thorough understanding of some example embodiments. It will be evident, however, to one skilled in the art that the present disclosure may be practiced without these specific details.

FIGS. 1A-1D are block diagrams illustrating a communication link reestablishment 100, according to an embodiment. FIGS. 1A-1D show the communication link reestablishment 100 split into stages 1-4, respectively. Each stage shows an example communication link that includes an endpoint transmitter (TX), two intervening re-timers, and an end-point receiver (RX), such as end-point TX 110, first re-timer 115, second re-timer 120, and end-point RX 125. While FIGS. 1A-1D show two intervening re-timers, more than two retimers may be used.

Following entering low-power mode, the components may be activated through a predetermined sequence. In an example, all link components (e.g., end-points and re-timers) may be activated (e.g., woken up), such as using low-frequency periodic signaling (LFPS). Following this activation, the end-points may begin sending high-speed training data with SSC clock modulation. The re-timers may begin sending training data from a local training engine using an unmodulated local clock (e.g., without SSC modulation). While sending this training data, the re-timers may not forward incoming data or clock signals from either end-point because the re-timer receiver is not yet fully trained, so the recovered data and clock are too unreliable to be used. Once all of the end-points are fully trained, the re-timers may switch sequentially from sending local data with local clock to forwarding incoming data with the associated recovered clock. Switching from local clock in the re-timers to using an incoming clock signal may be unreliable or time-consuming when the incoming clock contains SSC modulation. To avoid a large frequency step that may be difficult to track between end-points, the clock switching may be applied when the instantaneous frequency of the incoming clock is close enough to the frequency of the local clock. In an example, a switching delay of two SSC cycles (e.g., ~60 μs) may be observed before switching from the local to the incoming SSC modulated clock.

As shown in FIG. 1A, stage 1 may be used to prepare a communication link for a reduced switching delay. In stage 1, the end-point TX 110 sends data without activating its SSC clock modulation circuitry. The first re-timer 115 sends training data timed with a first re-timer local clock, and the second re-timer 120 similarly sends training data timed with a second re-timer local clock to the end-point RX 125.

Figure 1B:
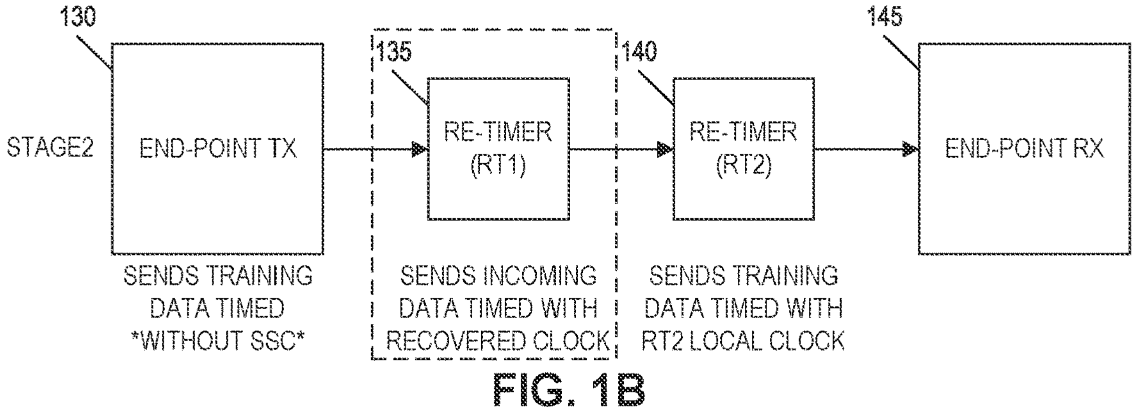

In stage 2 shown in FIG. 1B, the clock within the first re-timer 135 has been recovered. The end-point TX 130 continues to send training data without SSC clock modulation to the first re-timer 135. The first re-timer 135 sends incoming data to second re-timer 140 using the first recovered clock signal, and the second re-timer 140 sends training data timed with the second re-timer local clock (e.g., an unrecovered clock signal) to the end-point RX 145.

Figure 1C:
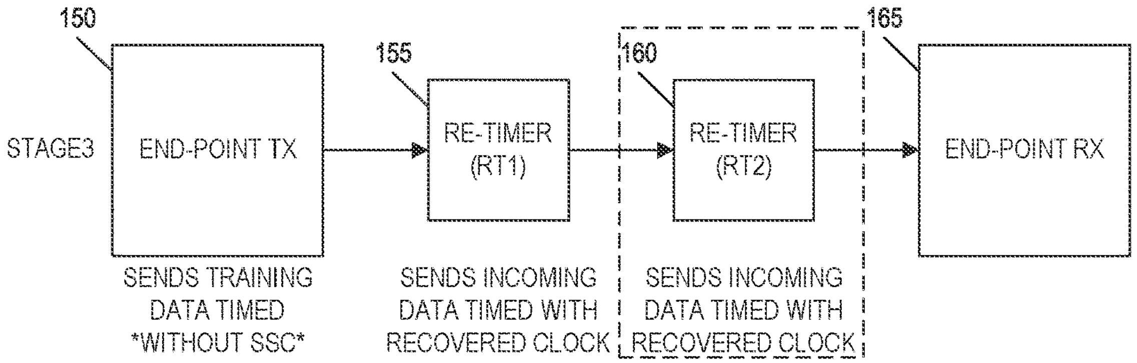

In stage 3 shown in FIG. 1C, the clock within the second re-timer 160 has been recovered. The end-point TX 150 continues to send training data without SSC clock modulation to the first re-timer 155. The first re-timer 155 sends incoming data to second re-timer 160 using the first recovered clock signal, and the second re-timer 160 sends incoming data to the end-point RX 165 using the second recovered clock signal.

Figure 1D:
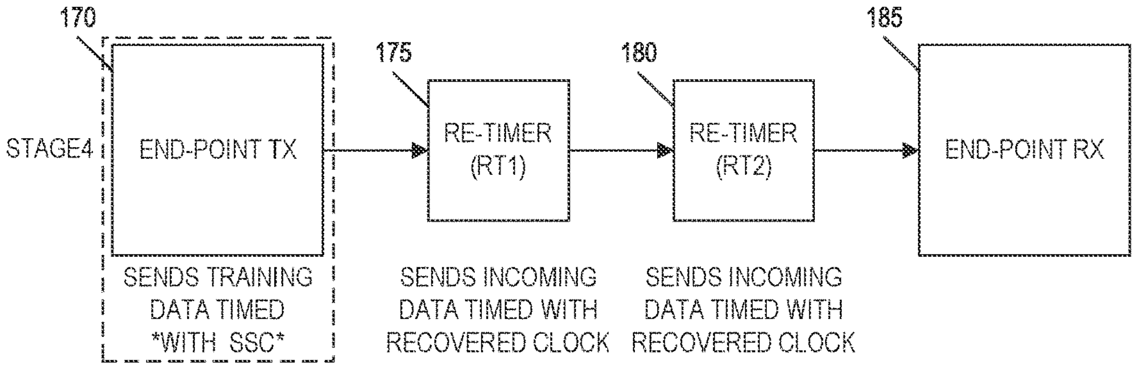

In stage 4 shown in FIG. 1D, both the first re-timer 175 and the second re-timer 180 are using recovered clock signals. The end-point TX 170 may send data using SSC clock modulation to the first re-timer 175, the first re-timer 175 sends the incoming data timed with the first recovered clock signal to the second re-timer 180, and the second re-timer 180 sends the incoming data timed with the second recovered clock signal to the end-point RX 185.

The four-stage sequence shown in FIGS. 1A-1D may be extended to configurations that involved more than two intervening re-timers. In an example, to extend to a configuration with three intervening re-timers, an additional stage would be inserted between stage 3 and stage 4. In this example additional stage, the clock within the third re-timer (not shown) has been recovered. The end-point TX 150 continues to send training data without SSC clock modulation to the first re-timer 155. The first re-timer 155 sends incoming data to second re-timer 160 using the first recovered clock signal, and the second re-timer 160 sends incoming data to the third re-timer using the second recovered clock signal, and the third re-timer sends incoming data to the end-point RX 165 using the third recovered clock signal. The final stage 4 occurs following all of the intervening re-timers having fully recovered clock signals, at which point the end-point TX 170 sends data using SSC clock modulation to the first re-timer 175, the first re-timer 175 sends the incoming data timed with the first recovered clock signal to the second re-timer 180, the second re-timer 180 sends the incoming data timed with the second recovered clock signal to the third re-timer, and the third re-timer sends the incoming data timed with the third recovered clock signal to the end-point RX 185.

Figure 2:
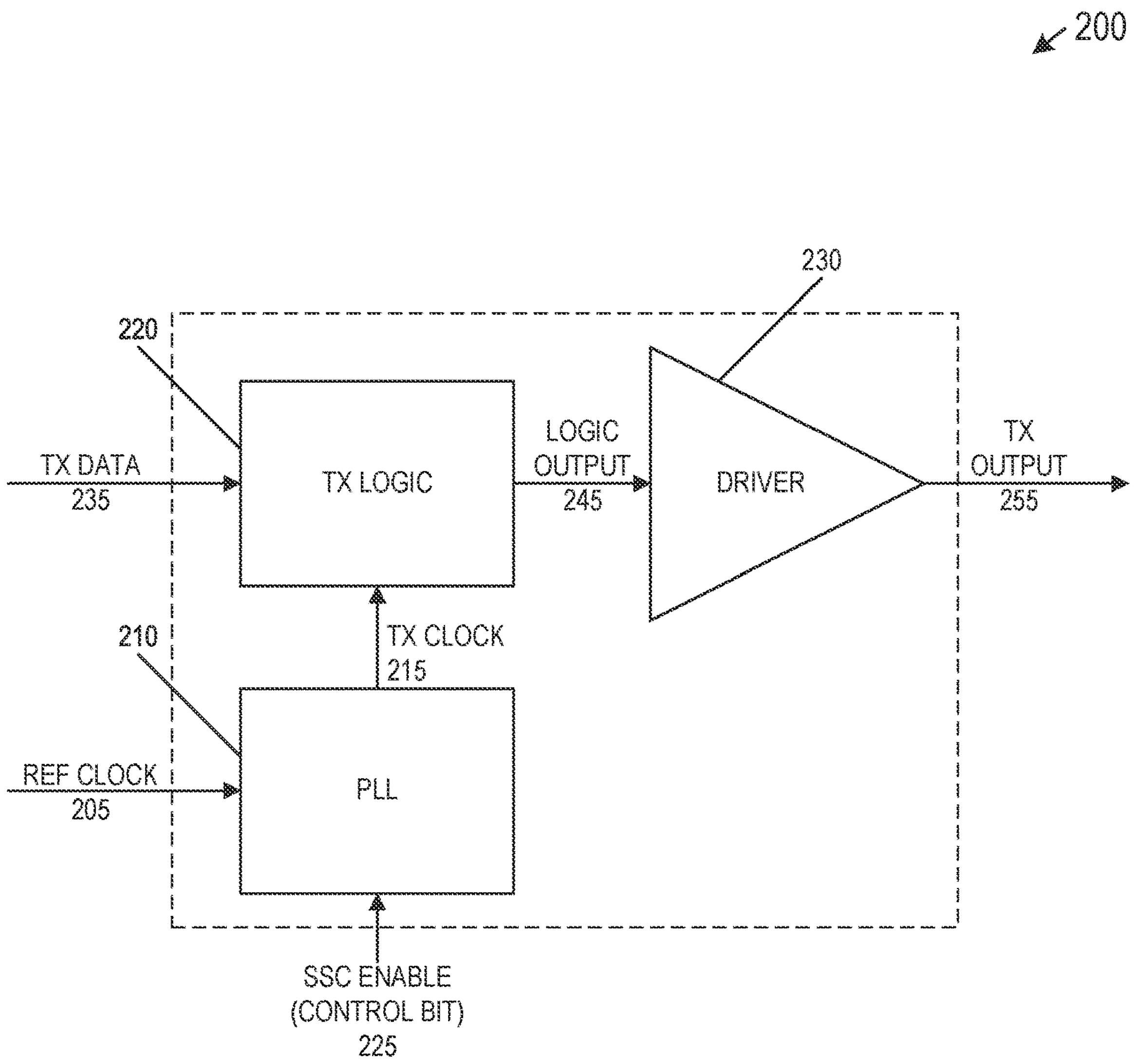
FIG. 2 is a circuit diagram of a dynamic SSC activation transmitter, according to an embodiment.

FIG. 2 is a circuit diagram of a dynamic SSC activation transmitter 200, according to an embodiment. Transmitter 200 may be used to provide an improved communication link, such as end-point TX shown in FIGS. 1A-1D. The SSC modulation within transmitter 200 may be applied within a transmitter phase-locked loop (PLL) 210.

The PLL 210 may receive a reference clock signal 205 that may be used to generate a TX clock signal 215. The PLL 210 may provide the TX clock signal 215 (e.g., SSC modulated or otherwise) to a TX logic circuit 220. The TX logic circuit 220 may use the TX clock signal 215 and a TX data input signal 235 to generate a TX logic output signal 245. The TX logic output signal 245 may be amplified at a driver 230 to generate a TX output signal 255 to be provided to a connected re-timer.

The PLL 210 may receive an SSC enable control signal 225 (e.g., SSC control bit) that may be used to enable or disable SSC modulation. When the SSC enable control signal 225 indicates SSC modulation is disabled (e.g., SSC control bit set to low), the TX clock signal 215 may be generated using the reference clock signal 205, such as by passing through the reference clock signal 205 without modification. When the SSC enable control signal 225 indicates SSC modulation is enabled (e.g., SSC control bit set to high), the TX clock signal 215 may be generated using an SSC modulation of the reference clock signal 205. The SSC enable control signal 225 may be set dynamically based on USB link status. In an example, the SSC enable control signal 225 may be off during training, may be switched to on once all re-timers have switched their clock, and may remain on during steady-state USB link operation. In an example, the SSC enable control signal 225 may be modified at an end-point RX, such as end-point RX shown in FIGS. 1A-1D.

Figure 3:
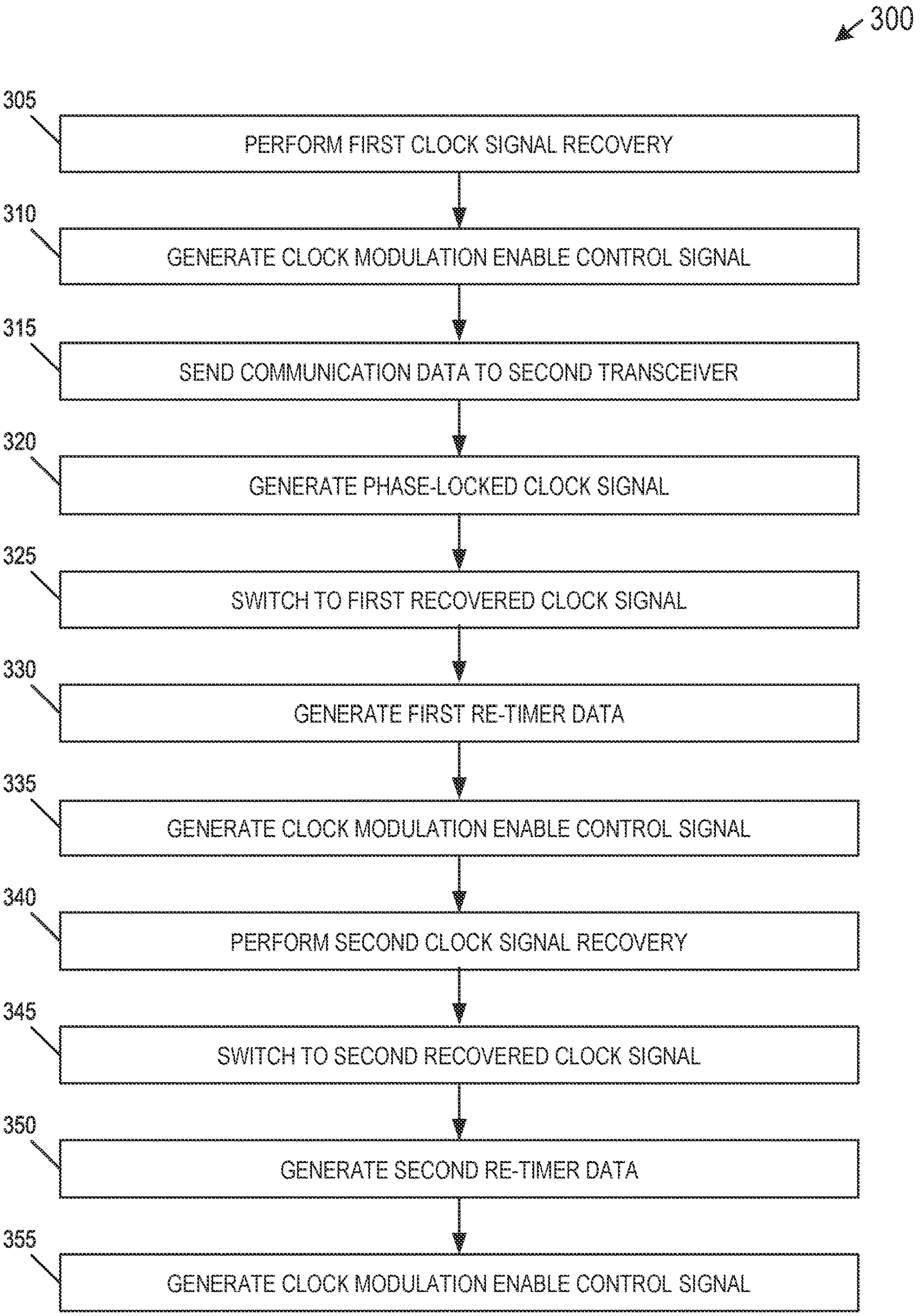
FIG. 3 is a flowchart illustrating a method for communication link synchronization, according to an embodiment.

FIG. 3 is a flowchart illustrating a method 300 for communication link synchronization, according to an embodiment. Method 300 includes performing 305, at a first re-timer, a first clock signal recovery of a first clock signal subsequent to exiting a low-power communication link mode. Method 300 includes generating 310, at a second transceiver, a clock modulation enablement control signal responsive to the first clock signal recovery. Method 300 includes sending 315, responsive to receiving the clock modulation enablement control signal, communication data from a first transceiver through the first re-timer to the second transceiver. The first transceiver, the first re-timer, and the second transceiver may form a universal serial bus (USB) communication link. Method 300 may include generating 320, at a phase-locked loop within the first transceiver, a phase-locked clock signal based on the clock modulation enablement control signal and a reference clock signal.

Method 300 may include switching 325, at the first re-timer, the first clock signal from a first local re-timer clock signal to a first recovered clock signal in response to completion of the first clock signal recovery. Method 300 may include generating 330, at the first re-timer, a first re-timer data based on the first clock signal. Method 300 may include generating 335, at the second transceiver, the clock modulation enablement control signal based on the first re-timer data.

Method 300 may include performing 340, at a second re-timer, a second clock signal recovery of a second clock signal subsequent to receiving the first re-timer data. Method 300 may include switching 345 the second clock signal at the second re-timer from a second local re-timer clock signal to a second recovered clock signal in response to completion of the second clock signal recovery. Method 300 may include generating 350, at the second re-timer, a second re-timer data based on the second clock signal. Method 300 may include generating 355, at the second transceiver, the clock modulation enablement control signal based on the second re-timer data.

Figure 4:
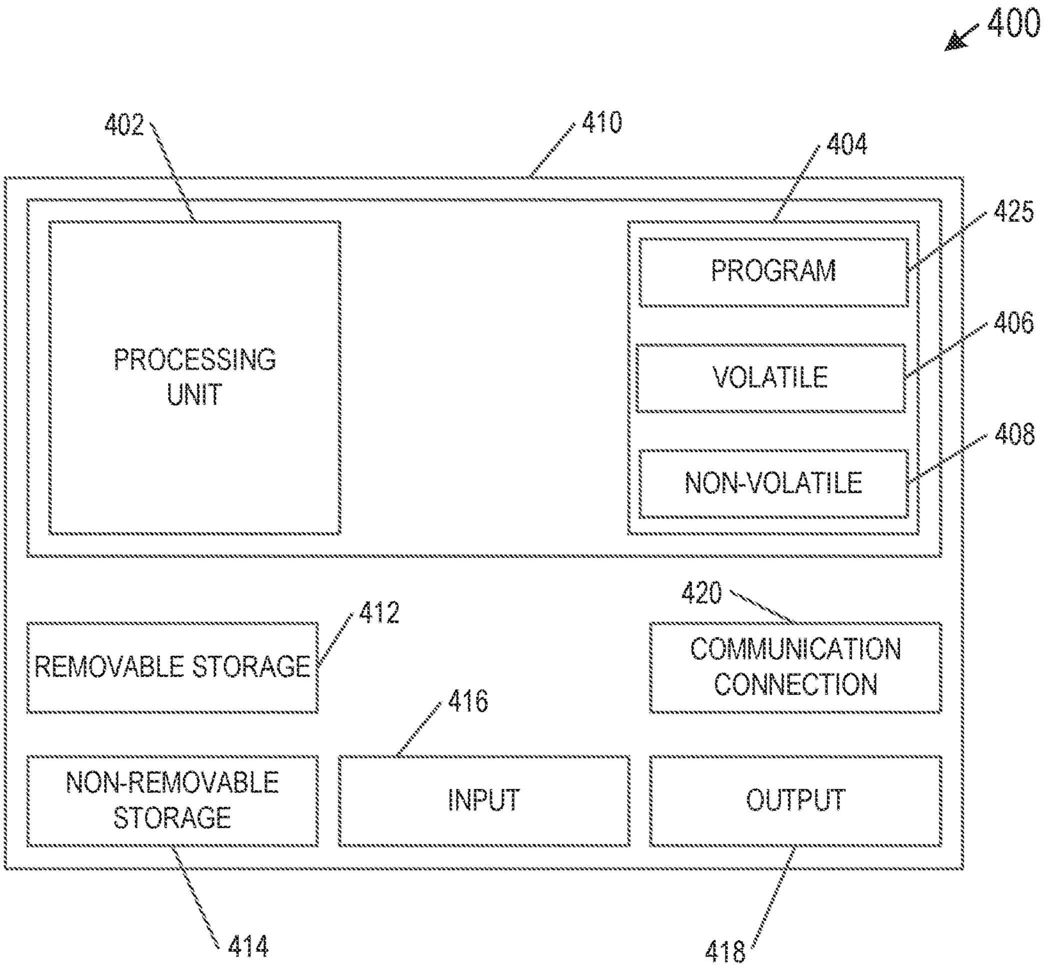
FIG. 4 is a block diagram of a computing device, according to an embodiment.

FIG. 4 is a block diagram of a computing device 400, according to an embodiment. The performance of one or more components within computing device 400 may be improved by including one or more of the circuits or circuitry methods described herein. Computing device 400 may include a dynamic SSC activation transmitter, which may include a transmitter PLL, a TX logic circuit, and a driver.

In one embodiment, multiple such computer systems are used in a distributed network to implement multiple components in a communication-based environment. An object-oriented, service-oriented, or other architecture may be used to implement such functions and communicate between the multiple systems and components. In some embodiments, the computing device of FIG. 4 is an example of a client device that may invoke methods described herein over a network. In other embodiments, the computing device is an example of a computing device that may be included in or connected to a motion interactive video projection system, as described elsewhere herein. In some embodiments, the computing device of FIG. 4 is an example of one or more of the personal computer, smartphone, tablet, or various servers.

One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, or other computing device including the same or similar elements as illustrated and described with regard to FIG. 4. Further, although the various data storage elements are illustrated as part of the computer 410, the storage may include cloud-based storage accessible via a network, such as the Internet.

Returning to the computer 410, memory 404 may include volatile memory 406 and non-volatile memory 408. Computer 410 may include or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 may include one or more of a touchscreen, touchpad, mouse, keyboard, camera, and other input devices. The input 416 may include a navigation sensor input, such as a GNSS receiver, a SOP receiver, an inertial sensor (e.g., accelerometers, gyroscopes), a local ranging sensor (e.g., LIDAR), an optical sensor (e.g., cameras), or other sensors. The computer may operate in a networked environment using a communication connection 420 to connect to one or more remote computers, such as database servers, web servers, and another computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

The apparatuses and methods described above may include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

In the detailed description and the claims, the term "on" used with respect to two or more elements (e.g., materials), one "on" the other, means at least some contact between the elements (e.g., between the materials). The term "over" means the elements (e.g., materials) are in close proximity, but possibly with one or more additional intervening elements (e.g., materials) such that contact is possible but not required. Neither "on" nor "over" implies any directionality as used herein unless stated as such.

In the detailed description and the claims, a list of items joined by the term "at least one of" may mean any combination of the listed items. For example, if items A and B are listed, then the phrase "at least one of A and B" means A only; B only; or A and B. In another example, if items A, B, and C are listed, then the phrase "at least one of A, B and C" means A only; B only; C only; A and B (excluding C); A and C (excluding B); B and C (excluding A); or all of A, B, and C. Item A may include a single element or multiple elements. Item B may include a single element or multiple elements. Item C may include a single element or multiple elements.

In the detailed description and the claims, a list of items joined by the term "one of" may mean only one of the list items. For example, if items A and B are listed, then the phrase "one of A and B" means A only (excluding B), or B only (excluding A). In another example, if items A, B, and C are listed, then the phrase "one of A, B and C" means A only; B only; or C only. Item A may include a single element or multiple elements. Item B may include a single element or multiple elements. Item C may include a single element or multiple elements.

ADDITIONAL NOTES AND EXAMPLES

Example 1 is a system for communication link synchronization, the system comprising: a first re-timer to perform a first clock signal recovery of a first clock signal subsequent to exiting a low-power communication link mode; a second transceiver to generate a clock modulation enablement control signal responsive to the first clock signal recovery; and a first transceiver to send communication data through the first re-timer to the second transceiver in response to receiving the clock modulation enablement control signal.

In Example 2, the subject matter of Example 1 includes the first transceiver including a phase-locked loop to generate a phase-locked clock signal based on the clock modulation enablement control signal and a reference clock signal.

In Example 3, the subject matter of Examples 1-2 includes the first re-timer further to: switch the first clock signal from a first local re-timer clock signal to a first recovered clock signal in response to completion of the first clock signal recovery; and generate a first re-timer data based on the first clock signal.

In Example 4, the subject matter of Example 3 includes the second transceiver further to generate the clock modulation enablement control signal based on the first re-timer data.

In Example 5, the subject matter of Example 4 includes a second re-timer to: perform a second clock signal recovery of a second clock signal subsequent to receiving the first re-timer data; switch the second clock signal from a second local re-timer clock signal to a second recovered clock signal in response to completion of the second clock signal recovery; and generate a second re-timer data based on the second clock signal.

In Example 6, the subject matter of Example 5 includes the second transceiver further to generate the clock modulation enablement control signal based on the second re-timer data.

In Example 7, the subject matter of Examples 1-6 includes wherein the first transceiver, the first re-timer, and the second transceiver form a universal serial bus (USB) communication link.

Example 8 is a method for communication link synchronization, the method comprising: performing, at a first re-timer, a first clock signal recovery of a first clock signal subsequent to exiting a low-power communication link mode; generating, at a second transceiver, a clock modulation enablement control signal responsive to the first clock signal recovery; and sending, responsive to receiving the clock modulation enablement control signal, communication data from a first transceiver through the first re-timer to the second transceiver.

In Example 9, the subject matter of Example 8 includes generating, at a phase-locked loop within the first transceiver, a phase-locked clock signal based on the clock modulation enablement control signal and a reference clock signal.

In Example 10, the subject matter of Examples 8-9 includes switching, at the first re-timer, the first clock signal from a first local re-timer clock signal to a first recovered clock signal in response to completion of the first clock signal recovery; and generating, at the first re-timer, a first re-timer data based on the first clock signal.

In Example 11, the subject matter of Example 10 includes generating, at the second transceiver, the clock modulation enablement control signal based on the first re-timer data.

In Example 12, the subject matter of Example 11 includes performing, at a second re-timer, a second clock signal recovery of a second clock signal subsequent to receiving the first re-timer data; switching the second clock signal at the second re-timer from a second local re-timer clock signal to a second recovered clock signal in response to completion of the second clock signal recovery; and generating, at the second re-timer, a second re-timer data based on the second clock signal.

In Example 13, the subject matter of Example 12 includes generating, at the second transceiver, the clock modulation enablement control signal based on the second re-timer data.

In Example 14, the subject matter of Examples 8-13 includes wherein the first transceiver, the first re-timer, and the second transceiver form a universal serial bus (USB) communication link.

Example 15 is at least one non-transitory machine-readable storage medium, comprising instructions that, responsive to being executed with processor circuitry of a computer-controlled device, cause the processor circuitry to: perform, at a first re-timer, a first clock signal recovery of a first clock signal subsequent to exiting a low-power communication link mode; generate, at a second transceiver, a clock modulation enablement control signal responsive to the first clock signal recovery; and send, responsive to receiving the clock modulation enablement control signal, communication data from a first transceiver through the first re-timer to the second transceiver.

In Example 16, the subject matter of Example 15 includes the instructions further causing the processor circuitry to generate, at a phase-locked loop within the first transceiver, a phase-locked clock signal based on the clock modulation enablement control signal and a reference clock signal.

In Example 17, the subject matter of Examples 15-16 includes the instructions further causing the processor circuitry to: switch, at the first re-timer, the first clock signal from a first local re-timer clock signal to a first recovered clock signal in response to completion of the first clock signal recovery; and generate, at the first re-timer, a first re-timer data based on the first clock signal.

In Example 18, the subject matter of Example 17 includes the instructions further causing the processor circuitry to generate, at the second transceiver, the clock modulation enablement control signal based on the first re-timer data.

In Example 19, the subject matter of Example 18 includes the instructions further causing the processor circuitry to: perform, at a second re-timer, a second clock signal recovery of a second clock signal subsequent to receiving the first re-timer data; switch the second clock signal at the second re-timer from a second local re-timer clock signal to a second recovered clock signal in response to completion of the second clock signal recovery; and generate, at the second re-timer, a second re-timer data based on the second clock signal.

In Example 20, the subject matter of Example 19 includes the instructions further causing the processor circuitry to generate, at the second transceiver, the clock modulation enablement control signal based on the second re-timer data.

In Example 21, the subject matter of Examples 15-20 includes wherein the first transceiver, the first re-timer, and the second transceiver form a universal serial bus (USB) communication link.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The subject matter of any Examples above may be combined in any combination.

The above description and the drawings illustrate some embodiments of the inventive subject matter to enable those skilled in the art to practice the embodiments of the inventive subject matter. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for communication link synchronization, the system comprising:

a first re-timer configured to perform a first clock signal recovery of a first clock signal subsequent to exiting a low-power communication link mode;

a receiver configured to generate a spread-spectrum-clocking modulation enablement control signal responsive to the first clock signal recovery; and a transmitter configured to enable spread-spectrum-clocking modulation and send communication data through the first re-timer to the receiver in response to receiving the spread-spectrum-clocking modulation enablement control signal.

2. The system of claim 1, the transmitter including a phase-locked loop configured to generate a phase-locked clock signal based on the spread-spectrum-clocking modulation enablement control signal and a reference clock signal.

3. The system of claim 1, the first re-timer further configured to:

switch the first clock signal from a first local re-timer clock signal to a first recovered clock signal in response to completion of the first clock signal recovery; and generate a first re-timer data based on the first clock signal.

4. The system of claim 3, the receiver further configured to generate the spread-spectrum-clocking modulation enablement control signal based on the first re-timer data.

5. The system of claim 4, further comprising a second re-timer configured to:

perform a second clock signal recovery of a second clock signal subsequent to receiving the first re-timer data;

switch the second clock signal from a second local re-timer clock signal to a second recovered clock signal in response to completion of the second clock signal recovery; and generate a second re-timer data based on the second clock signal.

6. The system of claim 5, the receiver further configured to generate the spread-spectrum-clocking modulation enablement control signal based on the second re-timer data.

7. The system of claim 1, wherein the transmitter, the first re-timer, and the receiver form a universal serial bus (USB) communication link.

8. A method for communication link synchronization, the method comprising:

performing, at a first re-timer, a first clock signal recovery of a first clock signal subsequent to exiting a low-power communication link mode;

generating, at a receiver, a spread-spectrum-clocking modulation enablement control signal responsive to the first clock signal recovery; and sending, responsive to receiving the spread-spectrum-clocking modulation enablement control signal, communication data from a transmitter with spread-spectrum-clocking modulation enabled through the first re-timer to the receiver.

9. The method of claim 8, further comprising generating, at a phase-locked loop within the transmitter, a phase-locked clock signal based on the spread-spectrum-clocking modulation enablement control signal and a reference clock signal.

10. The method of claim 8, further comprising:

switching, at the first re-timer, the first clock signal from a first local re-timer clock signal to a first recovered clock signal in response to completion of the first clock signal recovery; and generating, at the first re-timer, a first re-timer data based on the first clock signal.

11. The method of claim 10, further comprising generating, at the receiver, the spread-spectrum-clocking modulation enablement control signal based on the first re-timer data.

12. The method of claim 11, further comprising:

performing, at a second re-timer, a second clock signal recovery of a second clock signal subsequent to receiving the first re-timer data;

switching the second clock signal at the second re-timer from a second local re-timer clock signal to a second recovered clock signal in response to completion of the second clock signal recovery; and generating, at the second re-timer, a second re-timer data based on the second clock signal.

13. The method of claim 12, further comprising generating, at the receiver, the eleek spread-spectrum-clocking modulation enablement control signal based on the second re-timer data.

14. The method of claim 8, wherein the transmitter, the first re-timer, and the receiver form a universal serial bus (USB) communication link.

15. At least one non-transitory machine-readable storage medium, comprising instructions that, responsive to being executed with processor circuitry of a computer-controlled device, cause the processor circuitry to:

perform, at a first re-timer, a first clock signal recovery of a first clock signal subsequent to exiting a low-power communication link mode;

generate, at a receiver, a spread-spectrum-clocking modulation enablement control signal responsive to the first clock signal recovery; and send, responsive to receiving the spread-spectrum-clocking modulation enablement control signal, communication data from a transmitter with spread-spectrum-clocking modulation enabled through the first re-timer to the receiver.

16. The at least one non-transitory machine-readable storage medium of claim 15, the instructions further causing the processor circuitry to generate, at a phase-locked loop within the transmitter, a phase-locked clock signal based on the spread-spectrum-clocking modulation enablement control signal and a reference clock signal.

17. The at least one non-transitory machine-readable storage medium of claim 15, the instructions further causing the processor circuitry to:

switch, at the first re-timer, the first clock signal from a first local re-timer clock signal to a first recovered clock signal in response to completion of the first clock signal recovery; and generate, at the first re-timer, a first re-timer data based on the first clock signal.

18. The at least one non-transitory machine-readable storage medium of claim 17, the instructions further causing the processor circuitry to generate, at the receiver, the spread-spectrum-clocking modulation enablement control signal based on the first re-timer data.

19. The at least one non-transitory machine-readable storage medium of claim 18, the instructions further causing the processor circuitry to:

perform, at a second re-timer, a second clock signal recovery of a second clock signal subsequent to receiving the first re-timer data;

switch the second clock signal at the second re-timer from a second local re-timer clock signal to a second recovered clock signal in response to completion of the second clock signal recovery; and generate, at the second re-timer, a second re-timer data based on the second clock signal.

20. The at least one non-transitory machine-readable storage medium of claim 19, the instructions further causing the processor circuitry to generate, at the receiver, the spread-spectrum-clocking modulation enablement control signal based on the second re-timer data.

21. The at least one non-transitory machine-readable storage medium of claim 15, wherein the transmitter, the first re-timer, and the receiver form a universal serial bus (USB) communication link.

* * * * *